United States Patent
Spanjer

[11] 3,784,079
[45] Jan. 8, 1974

[54] ULTRASONIC BOND CONTROL APPARATUS
[75] Inventor: Keith G. Spanjer, Scottsdale, Ariz.
[73] Assignee: Motorola Inc., Franklin Park, Ill.
[22] Filed: Apr. 3, 1972
[21] Appl. No.: 240,404

[52] U.S. Cl...................... 228/1, 29/470.1, 73/70.2, 73/71.4, 228/8
[51] Int. Cl................................................ B23k 5/20
[58] Field of Search.............................. 228/1, 8, 9; 29/470.1; 73/67, 67.2, 70.2, 71.4

[56] References Cited
UNITED STATES PATENTS
| | | | |
|---|---|---|---|
| 3,153,850 | 10/1964 | Worlton et al................ | 29/471.1 X |
| 3,158,928 | 12/1964 | Prisco et al.................. | 29/470.1 |
| 3,212,695 | 10/1965 | MacGregor................... | 29/470.1 X |
| 3,302,277 | 2/1967 | Pruden et al................. | 228/1 X |
| 3,380,150 | 4/1968 | Daniels....................... | 228/1 X |

FOREIGN PATENTS OR APPLICATIONS
275,702 6/1970 U.S.S.R....................... 228/1

Primary Examiner—J. Spencer Overholser
Assistant Examiner—Robert J. Craig
Attorney—Vincent J. Rauner and Henry T. Olsen

[57] ABSTRACT

A method and apparatus for improving the quality of the bond obtained from an ultrasonic welding apparatus. The formation of the bond is detected by monitoring the voltage applied to the ultrasonic transducer and by detecting a drop in the applied voltage indicative of bond formation. The bonding apparatus is turned off immediately following bond formation to prevent further ultrasonic energy from weakening the bond.

6 Claims, 3 Drawing Figures

PATENTED JAN 8 1974　　　　　　　　　3,784,079

ULTRASONIC BOND CONTROL APPARATUS

BACKGROUND

1. FIELD OF INVENTION

This invention relates generally to welding methods and apparatus, and more particularly to ultrasonic welding techinques employed in semiconductor manufacture and the like.

There are many applications wherein it is necessary to provide a welded connection to a small component. One such application is in the manufacture of semiconductor devices wherein it is necessary to make a reliable electrical and mechanical connection between the semiconductor chip and the package.

2. PRIOR ART

Several techniques for providing suitable electrical and mechanical connections between a semiconductor device and its package are known. One such system utilizes ultrasonic welding techniques wherein a wire, generally of gold or aluminum, is welded to a bonding pad, also generally of gold or aluminum, by bringing the wire and the bonding pad together under pressure and moving the wire with respect to the bonding pad for a predetermined time duration at an ultrasonic rate until sufficient heat is generated to weld the wire to the bonding pad. The welding cycle is timed, the time being adjusted in accordance with the diameter of the wire used and the amount of pressure applied. The time duration of the cycle is adjusted to form a bond under average conditions.

Another such system employs a transducer to sense the motion of the bonding head, and to turn off the apparatus when the amplitude of the vibrations of the ultrasonic head is reduced, the reduction being indicative of a bond formation.

Whereas these techniques provide a way to achieve a connection between a semiconductor device and its package, the time required for the bond to form is not readily predictable due to variations in surface properties. Therefore, the first technique requires that the ultrasonic transducer be operated for a relatively long period of time to assure that bonding occurs. However, in cases where the bond occurs rapidly, the continued application of ultrasonic energy weakens the bond and reduces the reliability of the device. The second technique provides a way to reduce the bond weakening problems associated with the first technique, however, the accuracy of this technique in detecting bond formation is limited.

SUMMARY

It is an object of the present invention to provide an improved welding apparatus that consistently provides good quality bonds.

It is a further object of this invention to provide a welding apparatus that automatically terminates the welding process when an optimum bond is achieved.

It is another object of this invention to provide a welding apparatus that automatically adjusts the welding time to compensate for differences in the materials being welded.

In accordance with a preferred embodiment of the invention, a wedge is used to apply ultrasonic welding energy to the workpiece. The wedge is coupled to a transducer by means of a horn comprising discrete diameter sections. Ultrasonic energy is applied to the transducer from a power supply to excite the wedge. A sensing circuit monitors the power applied to the transducer and shuts off the ultrasonic power supply when a relatively sharp power change, resulting from a change in acoustic impedance during bond formation, occurs.

DETAILED DESCRIPTION

Figure 1:
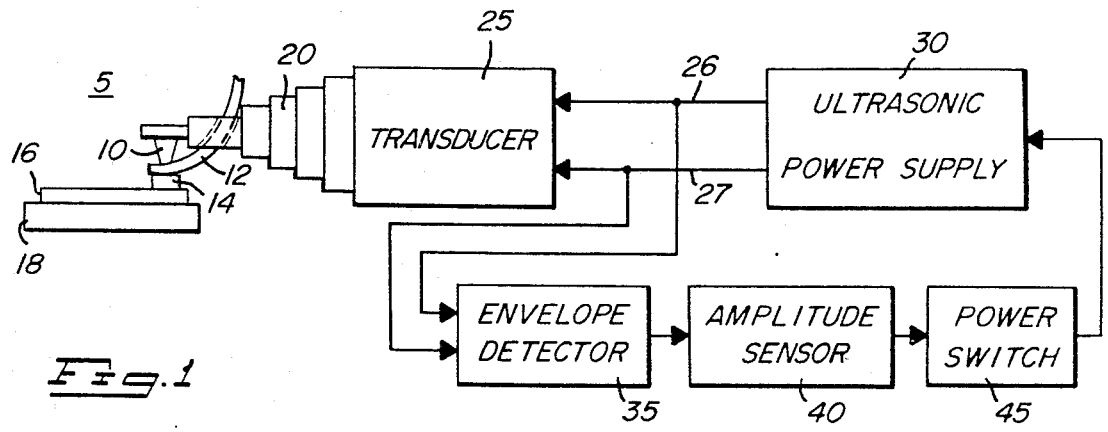
FIG. 1 shows, in block diagram form, a system for improving the quality of ultrasonic welds according to the invention, as applied to an ultrasonic welding apparatus.

Referring to FIG. 1, which shows a diagram of a preferred embodiment of the invention, a bonding head 5 comprising a wedge 10 and a horn 20 applies pressure and ultrasonic energy to a workpiece, in this embodiment a wire 12, which is to be bonded to a second workpiece, in this embodiment a semiconductor bonding pad 14, which is attached to a semiconductor chip 16. A support structure 18 is used to support chip 16 and bonding pad 14 during the welding operation. The aforementioned structure may be of conventional design.

Wedge 10 is driven by an ultrasonic transducer 25 which receives electrical energy via connections 26 and 27 and applies acoustic energy to wedge 10 through an acoustic energy transfer means, in this embodiment, horn 20. Horn 20 may be of a conventional design used in ultrasonic welders, however, in a preferred embodiment, the horn comprises a series of constant radius cylinders coupled to each other to form a tapering structure having a series of discrete radii. An ultrasonic power supply 30, which is of conventional design, is connected to transducer 25 and provides ultrasonic alternating current power to energize transducer 25.

An automatic shut-off system, according to the invention, comprises, in this embodiment, an envelope detector 35, an amplitude sensor 40 and a power switch 45, which are connected to each other, to transducer 25 and to ultrasonic power supply 30, as illustrated in FIG. 1. The automatic shut-off system de-activates power supply 30 when the bond between wire 12 and bonding pad 14 occurs.

Figure 2:
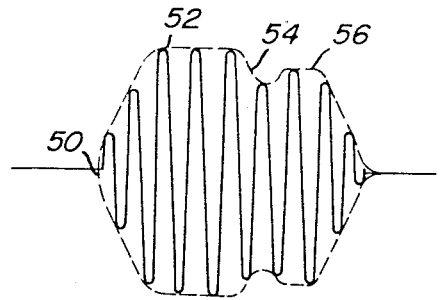
FIG. 2 shows a waveform of the voltage appearing at the electrical input terminals of the transducer of FIG. 1 during a typical welding cycle.

The formation of the aforesaid bond is evidenced by a drop in the voltage at the power input point of transducer 25 at connections 26, 27. Referring to FIG. 2, there is shown a waveform of the voltage appearing at the input connections 26, 27 of transducer 25 during a typical welding cycle. The dotted line in FIG. 2 is used to indicate the envelope of the waveform. The welding cycle begins at point 50 when power in the form of an alternating current voltage having a frequency of 50 to 60 KHz is applied to transducer 25. The voltage builds up as the welding process begins until a maximum value determined by the setting of power supply 30 is achieved at point 52. During this time, acoustic energy is transferred to wedge 10 by horn 20 causing wedge 10 to vibrate at an ultrasonic rate and to move wire 12 with respect to pad 14 along the surface of pad 14 at the ultrasonic rate. As the wire 12 is moved relative to pad 14, the heat generated by sheer stress and friction causes a portion of wire 12 to become plastic and to eventually adhere to pad 14. We believe that as the wire becomes plastic and a bond is made, the motion of wedge 10 is momentarily arrested when the wire bonds to pad 14 and no longer moves with wedge 10. The mechanical load change is transferred via horn 20 to transducer 25 and appears as a voltage change at the electrical connections 26, 27 of transducer 25. The mechanical load change results in a relatively sharp change in the power drawn by transducer 25, thereby causing dip 54 in the envelope of the waveform of FIG. 2 at the instant of bonding. After the bond has been made, wire 12 is firmly attached to pad 14 and no longer moves with wedge 10, and the load caused by wedge 10 moving with respect to wire 12 is transferred to transducer 25 and is indicated by the flat region 56. The amplitude of the envelope in region 56 is different from the value of the envelope at point 52 and is generally lower than the value of the envelope at point 52. It should be noted that although the voltage being monitored is the driving voltage at connections 26, 27, any voltage indicative of the load on wedge 10, such as, for example, voltage appearing on a secondary winding on an electromagnetic transducer may be monitored and still fall within the scope of the invention.

The elapsed time between initiation of the bonding cycle at point 50 and the time at which the weld occurs at region 54 is a function of the condition of the surfaces of wire 12 and pad 14, the voltage applied to transducer 25, the pressure applied to wedge 10 and the diameter of wire 12. The time required for a bond to take place varies widely due to surface conditions of pad 14 and wire 12 even when the pressure applied to wedge 10, the diameter of wire 12 and the voltage applied to transducer 25 are closely controlled. For example, for typical wire diameters, wedge pressure and transducer voltage, the time required for a bond to occur ranges from 10 to 15 milliseconds when the surfaces of wire 12 and pad 14 are exceptionally clean to over 150 milliseconds when the surfaces are dirty, with bonding times in the range of 30 to 40 milliseconds being typical.

According to the prior art, in order to assure that most attempts result in a good weld, transducer 25 is generally energized for a time period of 40 to 50 milliseconds to assure proper bonding of wires and pads having typical surfaces. Unfortunately, the continued operation of transducer 25 after a bond has been made causes wedge 10 to vibrate with respect to wire 12, thereby deforming and weakening wire 12 and the bond between wire 12 and pad 14. Hence, in apparatus operating according to the prior art, the bonds that occur early in the welding cycle are weakened by subsequent vibration of wedge 10, and bonds that require more than 40 to 50 milliseconds to form, do not form.

A bond detection system according to the prior art, which attempts to minimize the bond weakening problems of the aforementioned system, utilizes bonding head amplitude sensors or transducer current sensors to sense the difference in acoustic impedance at wedge 10 between the pre-bonding condition wherein wire 12 moves with wedge 10 and the post bonding condition wherein wire 12 is bonded to pad 14 and wedge 10 moves with respect to wire 12. This difference corresponds to the difference between areas 52 and 56 of FIG. 2, respectively.

The technique of the instant invention provides a more accurate indication of the bond because the voltage dip at point 54 occurs simultaneously with the bond and is relatively sharp and more pronounced than the voltage change between points 52 and 56, thereby being more readily detectable. In addition, the dip 54 remains relatively deep, regardless of the device, while the difference between points 52 and 56 varies considerably, there being little or no change between points 52 and 56 in some devices.

The sensing function is accomplished by envelope detector 35, amplitude sensor 40 and power switch 45 in this embodiment. It should be noted, however, that any circuitry performing this function may be used and still fall within the scope of the invention. Envelope detector 35 is connected to transducer 25 to detect the voltage appearing at the electrical connections 26, 27 of transducer 25. Envelope detector 35 may be of conventional design, and may include a simple diode detector. The output signal from envelope detector 35 has a voltage that is proportional to the amplitude of the envelope of the signal appearing at the input to transducer 25.

Figure 3:
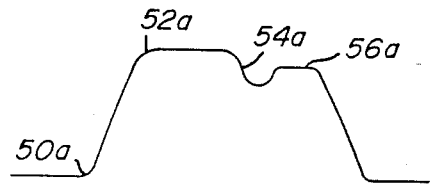
FIG. 3 shows the envelope of the waveform of FIG. 2 which is obtained at the output of the envelope detector of FIG. 1.

A typical waveform of the voltage appearing at the output of envelope detector 35 is shown in FIG. 3. Regions 50a, 52a, 54a and 56a of FIG. 3 correspond in time to regions 50, 52, 54 and 56 of FIG. 2, respectively. The output signal from envelope detector 35 is applied to amplitude sensor 40, which may be any circuit capable of detecting a drop in voltage, such as, for example, a differential amplifier having the signal from envelope detector 35 applied to one input and a reference voltage less than the voltage occurring in region 52a but greater than the minimum voltage of the dip 54a applied to the other input. Amplitude sensor 40 generates a signal in response to the voltage drop at 54a for triggering power switch 45, which may include, for example, a solid state switch or a relay for turning off ultrasonic power supply 30.

In order to assure that dip 54a is a well-defined dip, care must be taken in the design of horn 20. If this is not done, the change in acoustic impedance occurring at wedge 10 at the moment that the bond occurs, will not be effectively transmitted to transducer 25, thereby causing the dip to be very slight, or causing several dips to occur due to reflections within horn 20. It has been found through experimentation that a continuously tapering horn does not provide a suitable coupling between wedge 10 and transducer 25 for clearly defining the change in acoustic impedance at the instant of bonding, and that the change in acoustic impedance is more effectively transferred to transducer 25 through the use of a horn comprising several constant radius cylindrical sections connected to each other to form a horn having several discrete radii rather than a continuous taper. Other configurations having discrete steps in the taper have also proven effective. The discrete steps minimize the reflection problem caused by continuously tapered horns and produce a well defined voltage drop at the input of transducer 25 when bonding occurs.

The techniques of the instant invention provide a means for determining when an ultrasonic bond is formed by detecting a voltage change at the ultrasonic transducer that results from a change in the loading on the bonding head at the instant the bond is formed. This allows the ultrasonic welding apparatus to be turned off immediately following bond formation, thereby preventing weakening of the bond by subsequent application of ultrasonic energy, and provides more reliable ultrasonic bonds than could be heretofore achieved.

I claim:

1. In an acoustic bonding apparatus utilizing an electrically driven ultrasonic transducer and a bonding head energized by said transducer, a system for detecting the formation of a bond, comprising, means coupled to said transducer for monitoring the power supplied to said transducer and for detecting a relatively sharp change therein, said relatively sharp change being indicative of the formation of said bond, and switch means connected to said monitoring means and responsive thereto for de-energizing said head following said relatively sharp change.

2. In an acoustic bonding apparatus utilizing an ultrasonic transducer having an electrical connection thereto, and a bonding head energized by said transducer, a system for detecting the formation of a bond, including in combination, means coupled to said transducer for monitoring the voltage appearing at said electrical connection and for detecting a drop in the amplitude thereof, said drop being indicative of the formation of said bond, and switch means connected to said sensing means and responsive thereto for de-energizing said head following said drop in said voltage.

3. A system as recited in claim 2 further including acoustic energy transfer means coupled to said transducer and to said bonding head for coupling acoustic energy to said bonding head and for transferring a change in acoustic impedance to said transducer, said impedance change resulting from an impedance change occurring at said bonding head upon formation of said bond.

4. A system as recited in claim 3 wherein said energy transfer means includes a horn having means for reducing reflections of acoustic waves therein.

5. A system as recited in claim 3 wherein said energy transfer means includes a horn having discretely different cross sectional areas along a longitudinal axis.

6. A system as recited in claim 5 wherein said horn comprises a plurality of cylindrical structures having different radii coaxially coupled to each other to form a horn having discrete steps.

* * * * *